(12) United States Patent
Cheng et al.

(10) Patent No.: US 8,320,628 B2
(45) Date of Patent: Nov. 27, 2012

(54) METHOD AND SYSTEM FOR ASSISTING DRIVER

(75) Inventors: Kuo-Hsiang Cheng, Taipei County (TW); Wei-Min Li, Kaohsiung (TW); Long-Tai Chen, Miaoli County (TW); Dau-Chen Huang, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 357 days.

(21) Appl. No.: 12/822,850

(22) Filed: Jun. 24, 2010

(65) Prior Publication Data

US 2011/0103650 A1  May 5, 2011

(30) Foreign Application Priority Data

Nov. 2, 2009  (TW) ............................... 98137082 A

(51) Int. Cl.
*G06K 9/00*  (2006.01)
(52) U.S. Cl. ...................................................... 382/104
(58) Field of Classification Search .......... 382/104–107; 345/7; 701/36
See application file for complete search history.

(56) References Cited

U.S. PATENT DOCUMENTS

| | | | |
|---|---|---|---|
| 7,411,486 | B2 | 8/2008 | Gern et al. |
| 7,463,138 | B2 | 12/2008 | Pawlicki et al. |
| 7,583,182 | B2 | 9/2009 | Wang et al. |
| 2003/0197660 | A1* | 10/2003 | Takahashi et al. ............... 345/7 |
| 2004/0204807 | A1* | 10/2004 | Kimura et al. .................. 701/36 |
| 2006/0132295 | A1 | 6/2006 | Gern et al. |
| 2006/0206243 | A1 | 9/2006 | Pawlicki et al. |
| 2008/0043099 | A1 | 2/2008 | Stein et al. |
| 2008/0143509 | A1 | 6/2008 | Wang et al. |

FOREIGN PATENT DOCUMENTS

| | | |
|---|---|---|
| CN | 1945596 | 4/2007 |
| CN | 101727756 | 6/2010 |
| TW | I230128 | 4/2005 |
| TW | I301460 | 11/2006 |

OTHER PUBLICATIONS

China Office Action Issued on Jul. 4, 2012.
Taiwan Patent Office allowance issued on Apr. 23, 2012.

* cited by examiner

*Primary Examiner* — Vu Le
*Assistant Examiner* — Amara Abdi
(74) *Attorney, Agent, or Firm* — WPAT PC; Justin King

(57) ABSTRACT

A method and system for assisting driver are provided in the present disclosure, in which images captured by a single image sensing device is processed by a controller having capability of image processing and identification and distance estimation in image space for providing a complete assisting image-information while the carrier is moving forward or backward. By means of the method and system of the presented disclosure, it can identify the image characteristic to be a basis for lane departure assistance/alarm while the carrier is moving forwardly as well as generate assisting track and change view angle or issue an alarm according to the distance estimation while the carrier is moving backwardly. The present disclosure may be utilized and applied in different kinds of carrier type to solve the problem of guiding of carrier maneuvering, and assist carrier lane changing, parking assistance and blind spot detection.

20 Claims, 13 Drawing Sheets

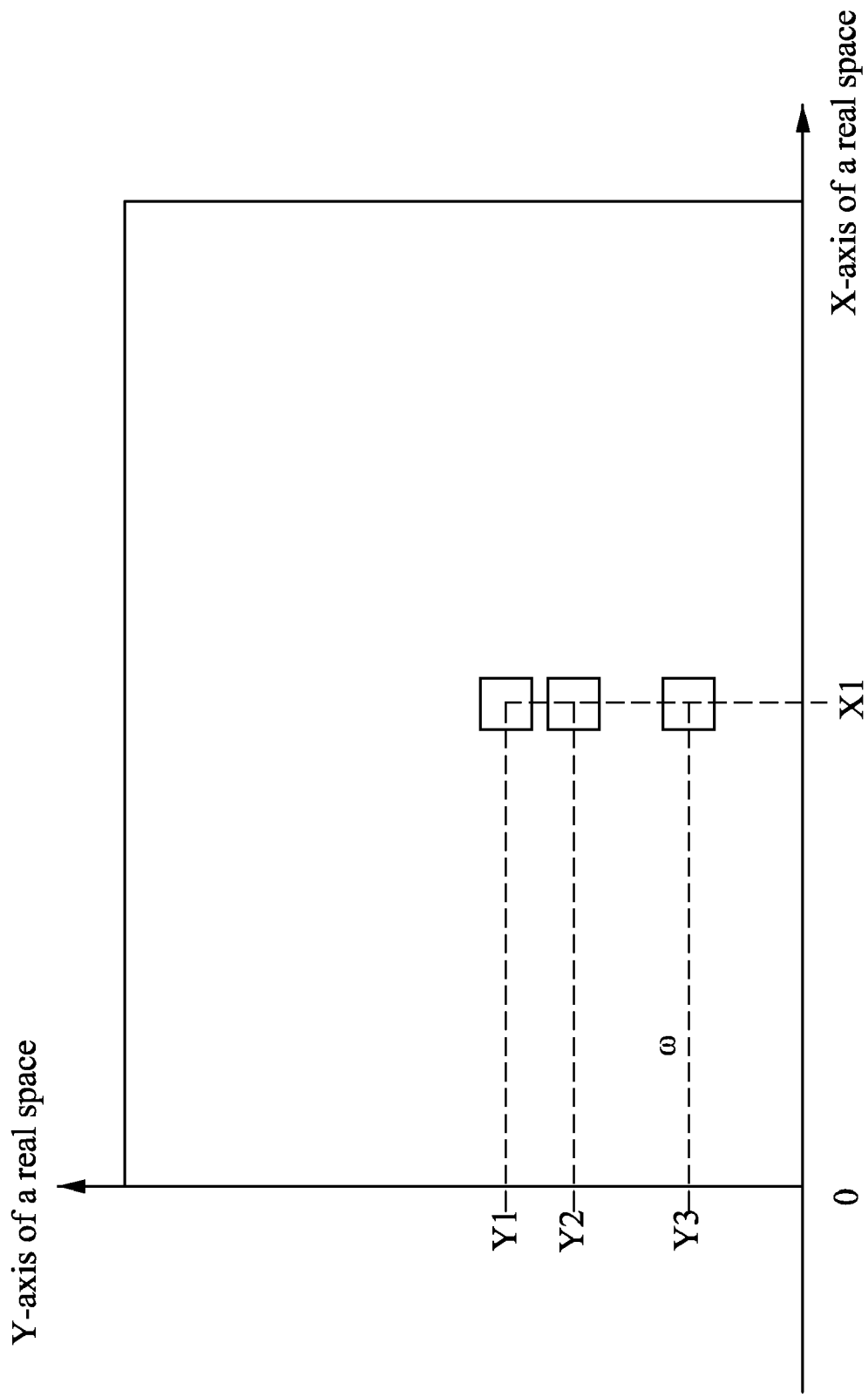

METHOD AND SYSTEM FOR ASSISTING DRIVER

TECHNICAL FIELD

The present disclosure relates to relates to a method for assisting the maneuvering of a carrier, and more particularly, to an image-based driving assistance method and system capable of applying an image identification technique upon images relating to a moving carrier for identifying specific feature objects along the moving trajectory of the carrier to be used as basis for generating a driving assistance procedure to assist the maneuvering of the carrier according to the relationship between the identified feature objects and the moving carrier.

TECHNICAL BACKGROUND

Generally, most drivers would be very much appreciated if he or she can have the ability to aware of each and every obstacle in his/her moving track of vehicle for improving driving safety, which is especially true when the driver is maneuvering a vehicle in his/her visual blind spots for parking or passing through a narrow road section. Nowadays, thanks to the rapid development in electronic technology, many automobile manufacturers had answered such desire by starting to install electric sensors in their products. There are two types of sensors that are most commonly used, one of which is referred as the distance sensor such as ultrasonic sensors, infrared sensors, millimeter wave sensors and radar sensor; and the other is referred as the image sensor such as CCD and CMOS. The distance sensor is usually being applied as a unidirectional obstacle detector for issuing an alarm for alerting the condition that there is an obstacle blocking the moving track of the vehicle on which it is installed, and is mostly seen in adaptive cruise control system, car reversing radar aid system, and so on. Moreover, the image sensor is used as a wide-range visual assistant in lane/vehicle identification system, rear view camera system, or blind spot detection system, and so on. It is noted that if there is a vehicle maneuvering system capable of providing a driver with sufficient information relating to the dynamic moving trajectory of the vehicle and the distances measured between the vehicle and the obstacles in its moving track, the driver can drive safely under the guidance of the vehicle maneuvering system with the minimum chance of collision.

There are already many driving assistant methods available. One of which is a land departure warning method and system disclosed in U.S. Pat. Pub. No. 20080143509, which capable of functioning to choose the data acquiring source according to brightness of the environment surrounding a vehicle and weather status so as to reduce the erroneous judgment of lane departure during image processing and analyzing. Moreover, in TW Pat. Appl. No. 095146946, a parking assistant apparatus comprising a activation unit, a first sensing unit, an guiding unit and a control unit is disclosed, by which as soon as a designated rear wheel is outside the defining of a parking lot and is detected by the first sensing unit detects, the activation unit is activated for enabling the control unit to direct the guiding unit to issue a signal fir informing the driver to reverse the steer wheel so as to park the vehicle inside the parking lot smoothly.

In addition, there is a driver assistance device for warning a driver of a motor vehicle of a risk of departure from the lane or from the lane disclosed in U.S. pub. No. 20060132295, which has at least one image-transmitting sensor, an evaluation device, connected to the image-transmitting sensor, for detecting edge-of-lane and/or lane markings and/or edges of lanes in the area sensed by the image-transmitting sensor, and a warning device which is connected to the evaluation device, in which driver assistance device in addition at least one distance-transmitting sensor is connected to the evaluation device, with which sensor the distance from objects which are elevated with respect to the surface of the lane can be determined in the region of the edge of the lane, in particular of a structural boundary of the edge of the lane. In U.S. Pub. No. 20060206243, an object detection system for vehicle is disclosed, which includes an imaging sensor and a control. Operationally, the imaging sensor is operable to capture an image of a scene occurring exteriorly of the vehicle while the control may apply an edge detection algorithm to the image after receiving the captured image so as to detect objects present within the image. Moreover, in China Pat. Appl. No. 200610097676.4, a robust lane line identification method for warning a driver of a motor vehicle of a risk of departure from the lane is disclosed, which perform a conditional edge detection respective upon two windows located at the left and the right of a vehicle for constructing corresponding gradient histograms accordingly to be used for conforming the gradient range relating to the edge of the lane line appear respectively in the two windows, and then a Kalman filter is used and applied to the gradient ranges of the two windows for filtering through all the candidate points which appear to be located at the edge of the lane line and thus for obtaining featuring parameters of the left lane line and the right lane line of a lane rapidly and accurately.

In addition, there is a driving assistance system mounted on a vehicle is disclosed in U.S. Pat. Pub. No. 20080043099. The system including a camera configured to acquire a plurality of images of the environment in front of the camera. The camera includes a filter wherein the filter is installed at the focal plane of the camera and wherein designated portions of the filter transmit selective light wavelength. The preferred filter has a checkerboard pattern. The system further including an image processor capable of analyzing in real time a plurality of respective image sequences acquired from at least one of the portions of the filter and is capable of detecting yellow lane markings on a concrete road surface.

TECHNICAL SUMMARY

The present disclosure provides a driving assistance method and system capable of functioning to establish the relationship between the dynamic moving trajectory of a carrier and obstacles on the moving track while issuing a driving assistance procedure accordingly to be used for assisting a driver of the carrier to maneuver the carrier, and thereby, the driver can drive safely under the guidance of the driving assistance system with the minimum chance of collision.

The present disclosure provides an image-based driving assistance method and system capable of applying an image processing/identification technique upon images relating to a moving carrier so as to generate information for assist a driver of the carrier to maneuver the carrier, in which the image processing/identification technique includes a lane departure warning algorithm, a track guidance algorithm and a viewpoint conversion algorithm. The lane departure warning algorithm is designed to identify lane lines from images captured by image sensing devices so as to issue an alerting signal when the carrier is moving departing from the defining of the identified lane lines. The track guidance algorithm is designed to use a motion vector determination method to determine the displacement of a pixel in an image space defined by images captured by cameras mounted on the carrier so as to obtain a real-time moving direction of the carrier basing on the displacement while displaying the moving trajectory of the carrier derived from the real-time moving direction in a dynamic route guidance curved lines to the driver of the carrier for informing the driver with the moving status of the carrier. The viewpoint conversion algorithm is designed to perform a reverse perspective transformation process incorporated with image distortion calibration technique upon images captured by cameras mounted on the carrier for generating a bird-view image overlooking the rear of the carrier that is provided to the driver in a real-time manner for enabling the same to derive the relative distances between the rear of the carrier and obstacles at the back of the carrier.

Moreover, the present disclosure provides a driving assistance method and system, capable of guiding the maneuvering of a carrier without the assistants from at least a camera and at least a steering angle sensor as those conventional driving guidance systems did. In addition, for enhancing the timing control of the switching between driving assistance functions in the driving assistance system and enhancing the accuracy of image recognition performed in the system, radar detectors are used and mounted on the carrier for detecting the ambient environment of the carrier so that the image resolutions of the range detection relating to the ambient environment of the carrier can be increased and also the timing for transforming images into the required bird-view image can be controlled accurately. Moreover, the driving assistance system of the disclosure is capable of guiding the maneuvering of a carrier by the use of a single image sensing device and an calculation algorithm embedded therein, thereby, its installation can be as easy as those common car surveillance system since there is no additional automobile sensors required to be connected, and consequently the system of the disclosure is low in cost, easy to install and flexible in usage.

In an embodiment, the present disclosure provides a driving assistance method, comprises the steps of: obtaining a surrounding image relating to the surrounding environment of a carrier while the carrier is moving; performing an image-based motion vector estimation based upon the variation of the surrounding image so as to determine a moving status of the carrier while the carrier is moving backward; constructing an assistant trajectory according to the moving status; making an evaluation to determine whether there is a feature object found in the varying surrounding image during the backward movement of the carrier; and if so, determining the distance between the carrier and the feature object; and performing a first assistance process according to the distance between the moving carrier and the feature object.

In another embodiment, the present disclosure provides a driving assistance system, comprising: an image sensing device, mounted on a moving carrier for capturing a surrounding image relating to the surrounding environment of the carrier; a control unit, coupled to the image sensing device for performing the following operations while the carrier is moving backward: determining a moving status of the carrier according to a motion vector relating to the movement of a specific block in the various surrounding images captured by the image sensing device at different time points; constructing an assistant trajectory according to the moving status; and performing a detection/identification process relating to a first feature object so as to determine a distance between the moving carrier and the first feature object; and a display unit, coupled to the control unit for displaying the surrounding image and the assistant trajectory of the carrier that is generated by the control unit.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 5A and FIG. 5B are schematic diagrams showing the distance measured in an image space and the real space according to the present invention.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
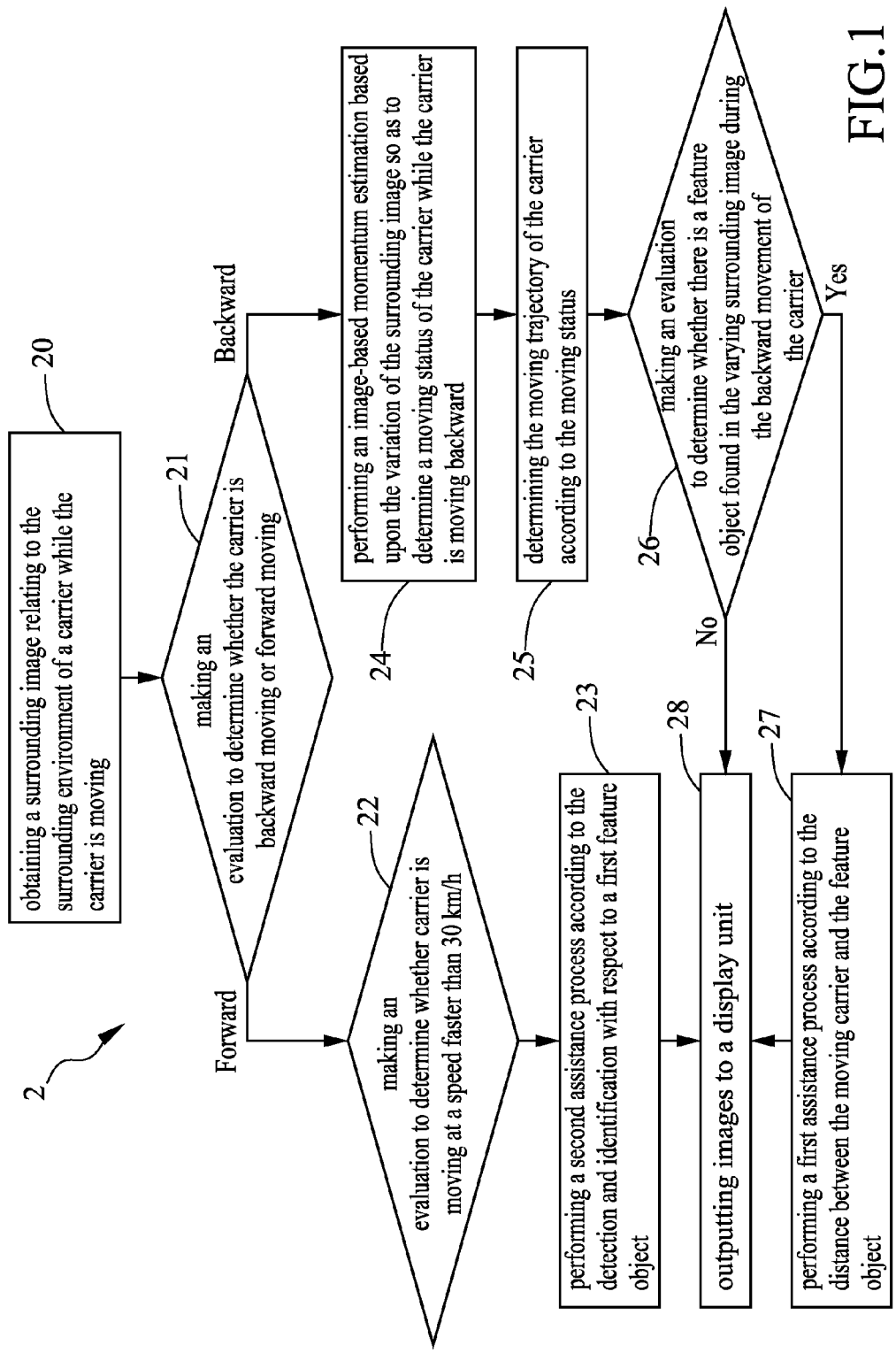
FIG. 1 is a flow chart depicting steps of a driving assistance method according to an embodiment of the present disclosure.

Please refer to FIG. 1, which is a flow chart depicting steps of a driving assistance method according to an embodiment of the present disclosure. The flow starts from step 20. At step 20, a process is performed for obtaining a surrounding image relating to the surrounding environment of a carrier by the use of an image sensing device mounted on the carrier while the carrier is moving; and then the flow proceeds to step 21. It is noted that the surrounding image can be a dynamic image or a static image, and nevertheless, in this embodiment, a series of continuously varying dynamic images are used as the surrounding images. It is noted that the carrier can be a wheeled vehicle, such as a car, a truck, a container, etc., or an aircraft or even a boat, but is not limited thereby. The image sensing device can be a device composed of charge-coupled devices (CCDs), complementary metal oxide semiconductors (CMOSs), and the like.

At step 21, an evaluation is made to determine whether the carrier is backward moving or forward moving, which can be decided according to the current operating gear position of the carrier; if moving forward, the flow proceeds to step 22; otherwise, the flow proceeds to step 24. At step 22, an evaluation is made to determine whether carrier is moving, but is not limited thereby at a speed faster than a specified speed, which can be 30 km/h in this embodiment; if so the flow proceeds to step 23; otherwise, the flow proceeds to step 28 for outputting images to a display unit. At step 23, a second assistance process is performed according to the detection and identification with respect to a first feature object, which can be a lane mark, a vehicle or an obstacle. In this embodiment, the pavement marker being specified as the first feature object is a lane line, and the obstacle is specified to be those vehicles moving or operating in the neighborhood of the moving carrier. It is noted that when the carrier in not moving at a speed exceeding the specific speed limit, the flow will proceeds to step 28 for directly displaying images captured by the image sensing device.

Figures 2A, 2B:
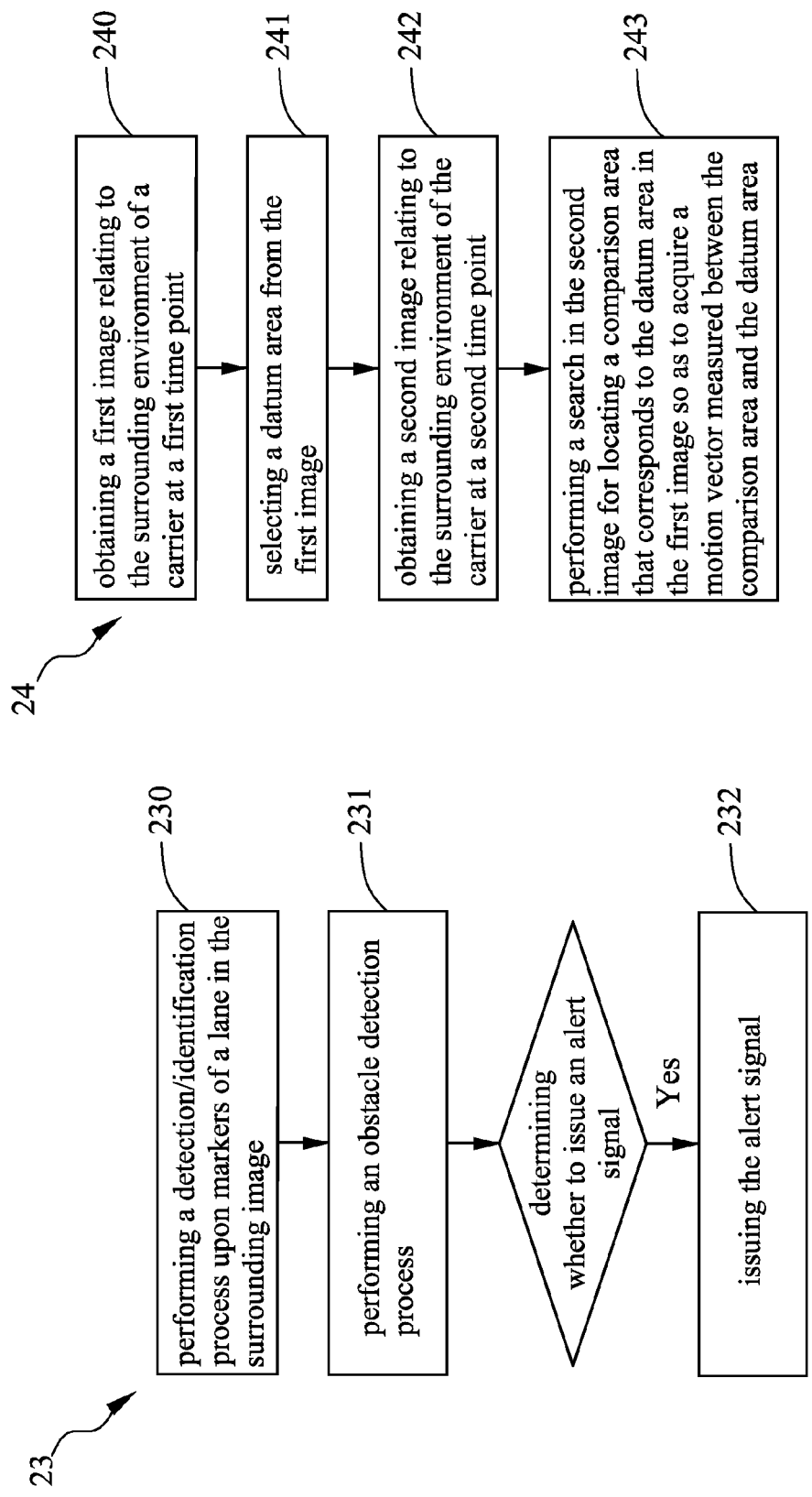
FIG. 2A is a flow chart depicting steps of a second assistance process of the present disclosure.
FIG. 2B is a flow chart depicting steps for determining the moving status of the carrier in the present disclosure.

Please refer to FIG. 2A, which is a flow chart depicting steps of a second assistance process of the present disclosure. In FIG. 2A, the flow of the second assistance process comprises: a step 230 for performing a detection/identification process upon pavement markers of a lane in the surrounding image; and a step 231 for performing an obstacle detection process whereas the pavement markers of a lane to be detected and identified are lane lines of the lane where the carrier is moving thereon. The purpose of the step 230 is to identify the positions of the lane lines defining the lane on which the carrier is moving, so that the relative relationship between the position of the carrier and the lane lines can be determined so as to determine whether the carrier is going to move departing from the lane. As for the obstacle detection process performed in step 231, it can be an image recognition process or a radar detection process, or the combination of the two. In this embodiment, the obstacle detection process is a combined process of image recognition and radar detection.

At step 231, the obstacle detection process can determine whether there are obstacles or other vehicles in the neighborhood of the carrier; if so the process will further calculate whether the distance between the detected obstacle/vehicle is shorter than a specific safe distance to be used as base for determining whether an alert signal should be issued. It is reasonably that when the distance between the detected obstacle/vehicle is shorter than the specific safe distance, the alert signal will be issued. It is noted that the specific safe distance can be any length determined according to actual requirement at will. Operationally, when the carrier is moving departing from the lane or there is a vehicle or obstacle being found dangerously close to the moving carrier, the alert signal will be issued. It is noted that the alert signal can be an alarming sound, a flashing of indication light, or an icon displayed on the display unit, whichever can warn the driver of the carrier with the dangerous condition.

When the process performed in step 21 of FIG. 1 determine that the carrier is moving backward, the flow will proceeds to step 24. At step 24, an image-based motion vector estimation is performed basing upon the variation of the surrounding image so as to determine a moving status of the carrier while the carrier is moving backward. In this step, the method of the disclosure will detect specific features in a series of surrounding images captured at difference time points while identifying the moving characteristic of such specific features so as to obtain a moving direction relating to such specific feature to be used for determining a moving status of a carrier. Then, according to the moving status of the carrier, such as the carrier is turning while backing up, a moving trajectory of the carrier can be estimated and thus displayed to the driver of the carrier as reference. Please refer to FIG. 2B, which is a flow chart depicting steps for determining the moving status of the carrier in the present disclosure. The flow of FIG. 2B starts from step 240. At step 240, a process is performed for obtaining a first image relating to the surrounding environment of a carrier at a first time point; and then the flow proceeds to step 241. Moreover, in this embodiment, the first image is an image capturing the rear surrounding environment of the carrier, but is not limited thereby; and the first image can be captured by the use of those conventional imaging device, such as CCD or CMOS, as those imaging device can be mounted easily on the rear of the carrier for capturing rear-view images of the carrier.

Figure 3B:
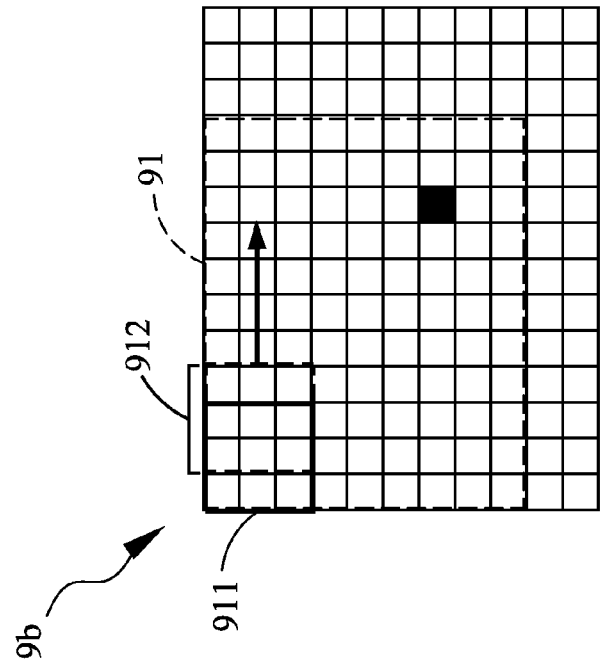
FIG. 3B is a schematic diagram showing a second image in the present disclosure.
Figure 3A:
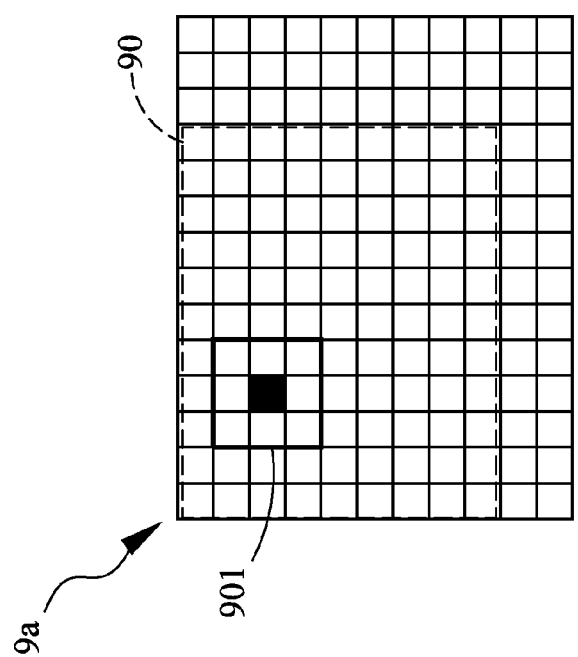
FIG. 3A is a schematic diagram showing a first image in the present disclosure.

At step 241, a datum area is selected from the first image; and then the flow proceeds to step 242. As the first image 9a shown in FIG. 3A, there is a detection area 90 first being designated in the first image 9a and then a specific region in the detection area 90 is selected to be a datum area 901. It is noted that the size and range of the detection area 90 is determined basing on actual requirement without special restriction which is also true to the datum area. At step 242, a second image relating to the surrounding environment of the carrier is obtained at a second time point, as shown in FIG. 3B; and then the flow proceeds to step 243. It is noted that when the second image of the carrier captured at the second time point is taken while the carrier is moving backwardly, there will be differences between the first and the second images which can be detected by image processing and thus to be used for identifying the movement of the carrier.

At step 243, a search is performed in the second image 9b for locating a comparison area that corresponds to the datum area 901 in the first image 9a so as to acquire a motion vector measure between the comparison area and the datum area 901. Similar to the first image 9a shown in FIG. 3A, there is a detection area 91 first being designated in the second image 9b and then a detection window 911 of the same size as the datum area 901 of the first image 9a is formed in the detection area 91 in a manner that it is moved from left to right and top to bottom therein and is compared with the datum area 901 each time it is move to a different location until a comparison area corresponding to the datum area 901 is identified and located in the second image 9b. As shown in FIG. 3B, the first comparison is performed when the detection window 911 is located at the top-left corner of the second image 9b. In this embodiment, the detection window 911 is a 3-pixel by 3-pixels block, but it is not limited thereby. It is noted that the size of the detection window 911 is determined basing on the size of the datum area 901 selected in the first image 9a so that the size of the detection window 911 is changed when the size of the datum area 901 is changed. In FIG. 3B, the feature characteristic in the area covered by the detection window 911 can be obtained by the following formula:

$$SAD_i(p,q) = \Sigma_{X,Y \in A_i} |I(t-1,X,Y) - I(t,X+p,Y+q)| \quad (1)$$

$$imv_i = \min_{p,q} SAD_i(p,q) \quad (2)$$

Wherein, $I(t-1, X, Y)$ represents a characteristic value of a location $(X,Y)$ in the image space defined in the first image 9a as it is taken at the first time point $(t-1)$, i.e. it is the characteristic value relating to the center of the datum area 901. In this embodiment, the characteristic value is gray level value. Moreover, $I(t, X, Y)$ represents the gray level value of a location (X, Y) in the image space defined in the second image 9b as it is taken at the second time point (t), i.e. it is the gray level value relating to the center of the detection window 911. $A_i$ is an image area defined in the second image by the detection window 911 as it is moved to its $i^{th}$ location. $SAD_i(p,q)$ is the sum of absolute difference (SAD) between the $i^{th}$ detection window 911 and the datum area 901 as the displacement between the center of $i^{th}$ detection window 911 and that of the datum area 901 in the space image is (p, q). The $\min_{p,q} SAD_i(p,q)$ represents the minimum of all the obtained SADs during the movement of the detection window 911; and $imv_i$ represents the local motion vector (LMV) of the $i^{th}$ detection window 911 which causes the minimum SAD.

Figure 3C:
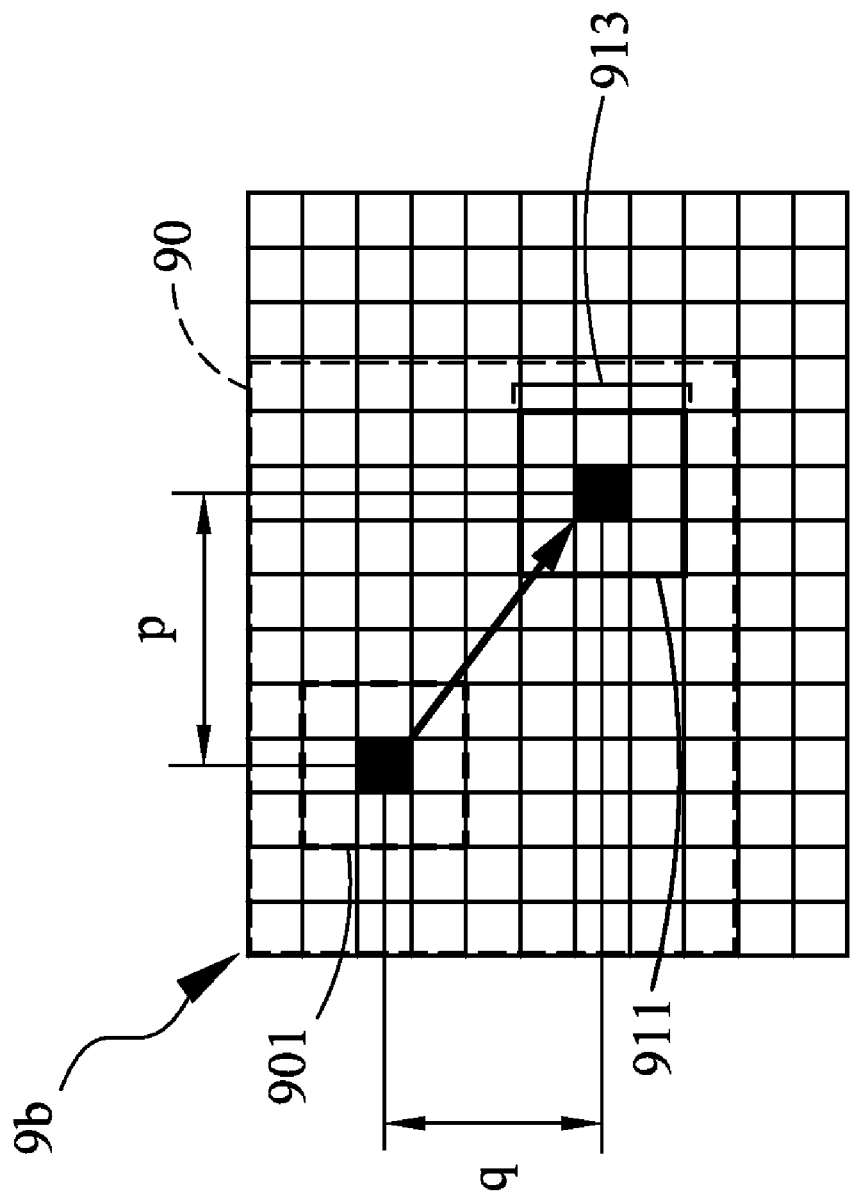
FIG. 3C is a schematic diagram showing a first image in the present disclosure.

As shown in FIG. 3B, a SAD value is first being obtained by comparing the area covering under the detection window 911 at its first location; and then, the detection window 911 is move to its right by one pixel for covering the area 912, another SAD value can be obtained using the formula (1) by the same comparison. As the detection window 911 is move from left to right and top to bottom in the second image 9b, there will be a plurality of such SAD values to be obtained. Thereafter, by the second formula (2), a minimum SAD is located from the plural SAD values. AS shown in FIG. 3C, if the area 913 is the area with the minimum SAD, it will be designated as the position where the datum area 901 should be in the second image 9b at the second time point (t) when the second image 9b is captured. Thus, as shown in FIG. 3C, the distance (p, q) between the datum area 901 at the first time point and the detection window 911 with the minimum SAD can be used as the motion vector happened form the first time point (t−1) and the second time point (t).

With continuing reference to FIG. 1, the step 25 is proceeded after the motion vector is obtained. At step 25, an assistant moving trajectory of the carrier is determined according to the motion vector. During the performing of the step 25, the motion vector obtained at step 24 according to the variation of the two images captured at two different time points is used for establishing the moving status of the carrier. For instance, when the carrier is backing with a specific steering angle, its moving trajectory can be estimated in advance since its backing distance per unit time and the steering angle are known. Thus, for reconstructing moving trajectory, a trajectory database relating a moving trajectory to its corresponding moving status of a carrier can be built in advance, in which the relationship between moving trajectory of a carrier with the carrier's steering angle, speed and parameters of an image sensing device mounted in the carrier for capturing image including height, viewing angle, overlook angle are established. Accordingly, by the motion vector obtained in step 24, the moving status of the carrier relating to its steering angle can be known and is used married with the parameters of an image sensing device mounted in the carrier for capturing image as basis to search in the trajectory database so as to locate an assistant moving trajectory corresponding thereto which is then being displayed to the driver of the carrier, as shown in FIG. 4.

Figure 4:
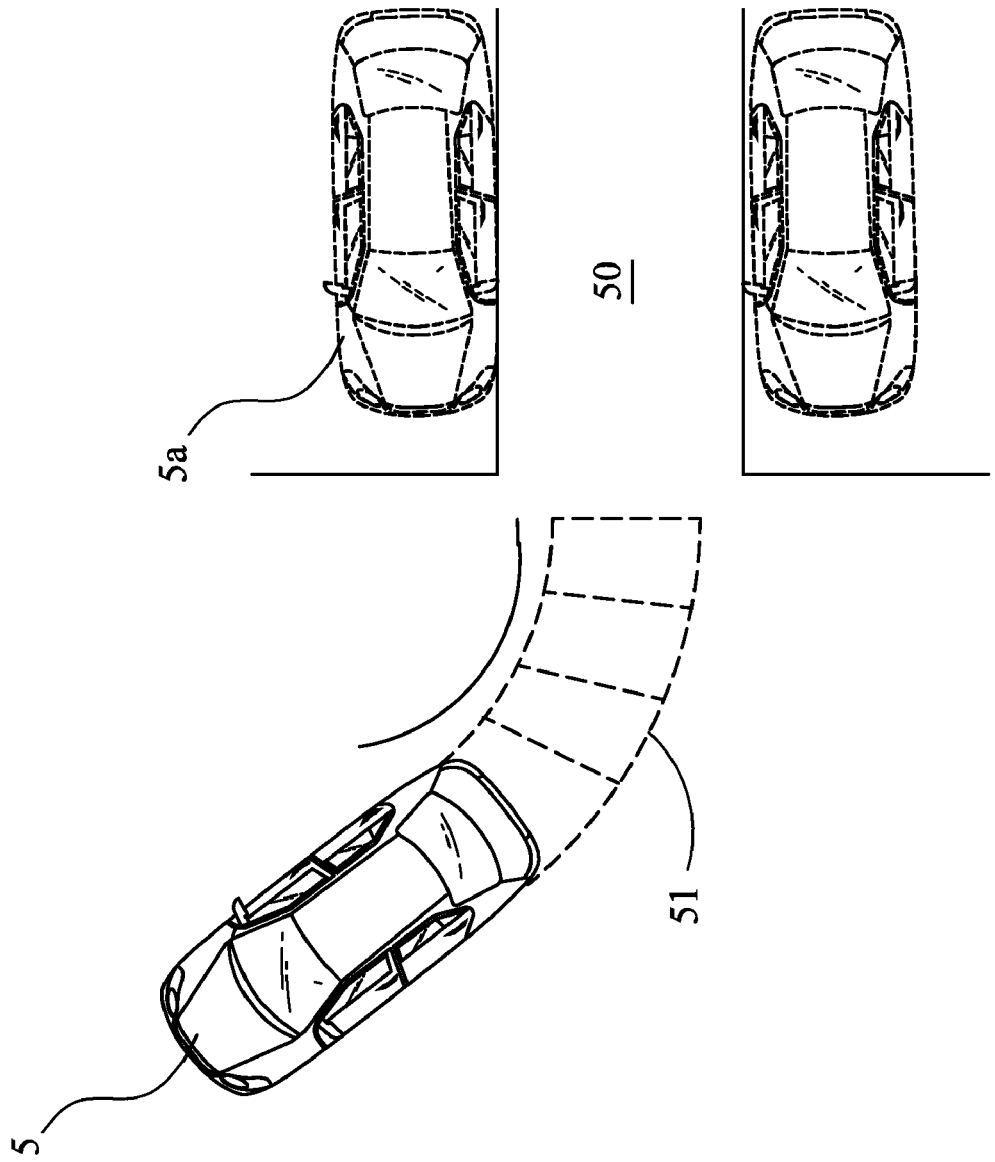
FIG. 4 is a schematic diagram showing an assistant trajectory of the carrier in the present disclosure.

In FIG. 4, the carrier 5 is backing up with a specific steering angle, during that its moving trajectory 51 can be estimated by the means illustrated in step 24 and step 25 and provided to the driver of the carrier for enabling the same to evaluate whether the carrier 5 is moving in a collision course with the either of the two vehicles 5a parking next to the parking lot 50, and if so, it can assist the driver to correct the moving trajectory 51 before collision. Conventionally, only images captured by the image sensing device mounted on the carrier are displayed to the driver of the carrier as reference despite that they are changed with the steering of the carrier. Nevertheless, there is no moving trajectory with driving assisting information being displayed to the driver so that the driver of the carrier can not be aware of any danger directly from those images form the image sensing device. However, by the moving trajectory obtained from the step 24 that are displayed to the driver as reference, the driver is able to rapidly and directly recognize whether the carrier is going to collide with an obstacle or drive on a pavement marker.

Figure 2C:
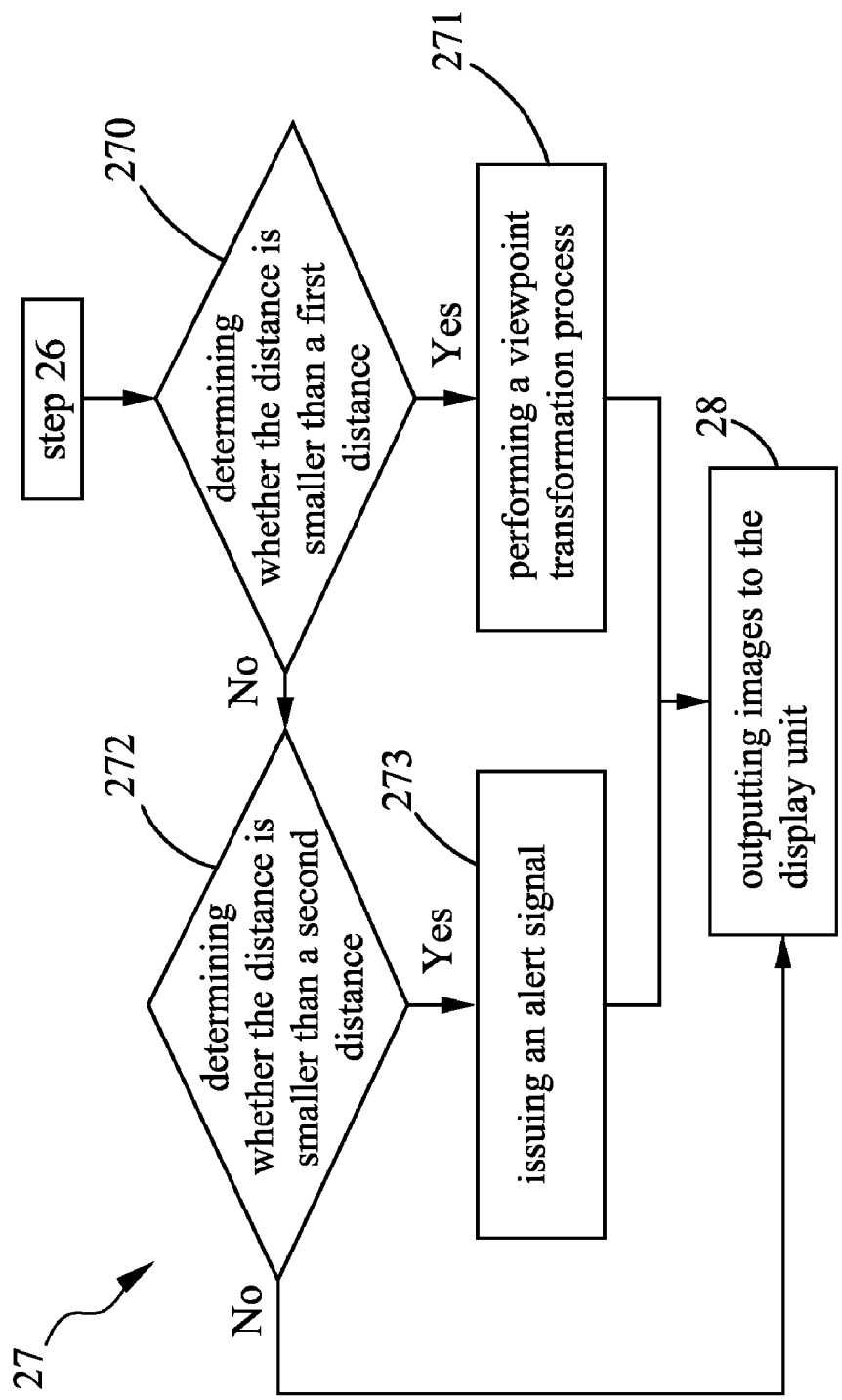
FIG. 2C is a flow chart depicting steps of a first assistance process of the present disclosure.

After the assistant trajectory is established, the step 26 in FIG. 1 is proceeded for determining whether there is a feature object found in the varying surrounding image during the backward movement of the carrier; if so, the flow proceeds to step 27 for performing a first assistance process according to the distance between the moving carrier and the feature object; otherwise, the flow proceeds to step 28. In the embodiment, the feature object can be an obstacle like an immobile vehicle or a pavement marker like lane lines, but is not limited thereby. Moreover, the feature object detection performed in step 26 can be an image recognition process or a radar detection process, or the combination of the two. Please refer to FIG. 2C, which is a flow chart depicting steps of a first assistance process of the present disclosure. As shown in FIG. 2C, the performing of the first assistance process in step 27 starts at step 270. At step 270, an evaluation is made for determining whether the distance between the carrier and the detected feature object is smaller than a first distance; if so, the flow proceeds to step 271; otherwise, the flow proceeds to step 272. That is, as soon as the performing of step 26 determine that there is a feature object found in the varying surrounding image of the carrier, the distance between the carrier and the detected feature object will be calculated by the use of either an image recognition process or a radar detection process, and then the calculated distance is provided to step 270 for determining whether the distance is smaller than the specific first distance. When a radar detection process is adopted in this embodiment for detecting feature object, the distance between the carrier and the detected feature object can be calculated according to the reflection of radar signal by the feature object. On the other hand, when an image recognition process is adopted in this embodiment for detecting feature object, the distance between the detected feature object and the carrier is estimated by a means including the steps of: building in advance a formula for transforming coordinates used for defining locations of the at least one feature object detected in the images into distances in real world; and using the coordinates of the identified feature to obtain the distance to the identified feature object.

Figure 5A:
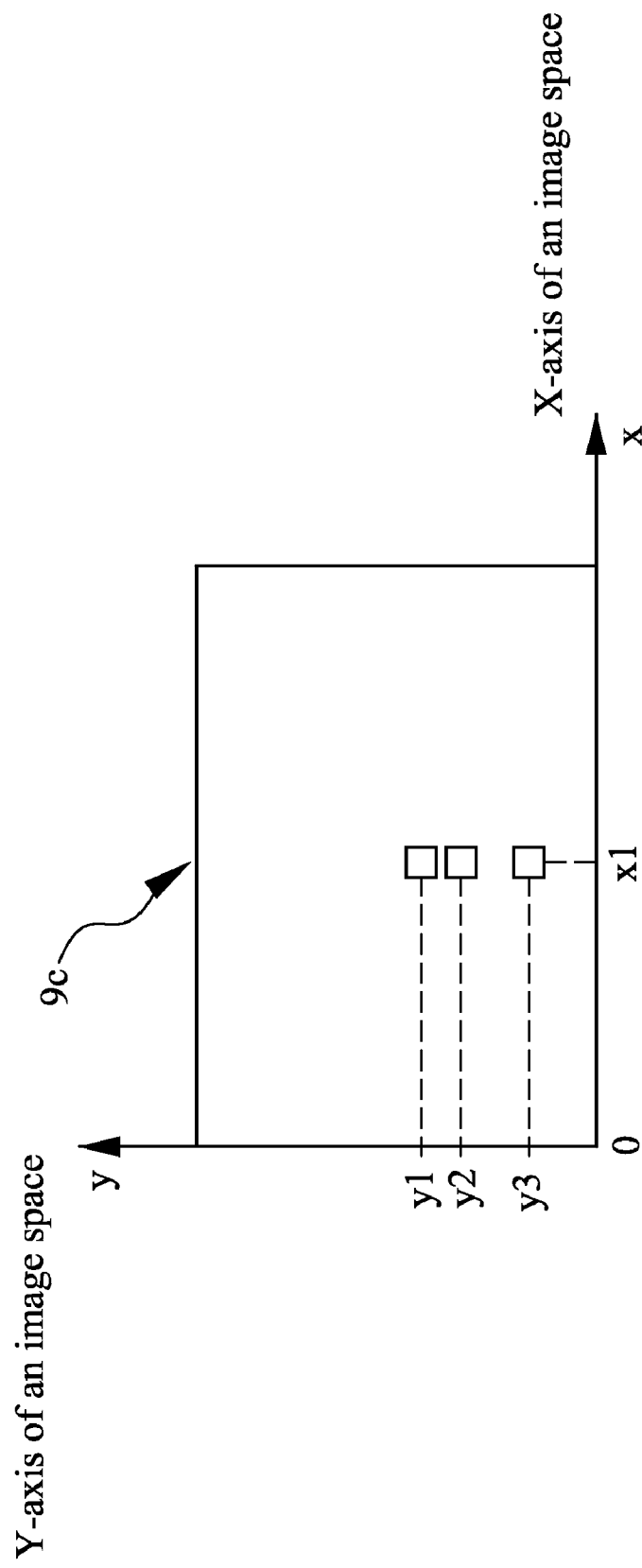

Please refer to FIG. 5A and FIG. 5B, which are schematic diagrams showing the distance measured in an image space and the real space according to the present invention. In FIG. 5A, the image 9c is an image captured by the image sensing device mounted on a carrier relating to the surrounding environment of the carrier. Since the position and height relating to where the image sensing device is mounted on the carrier, as well as its viewing angle, angle of depression and angle of elevation are known, the relationship between the real world and the image space of the image sensing device can be established in advance. It is noted that the so-called image space is an Cartesian coordinate system for defining the positions of each pixel in the image 9c captured by the image sensing device; while the real world refers to the environment where the carrier is in, As shown in FIG. 5A, the coordinates of each pixel in the image 9c that is measurable can be mapped with the coordinates of a location in real world that is corresponding thereto. Although one pixel is used in this embodiment as resolution unit, it is possible to include more than one pixel as a resolution unit to be used for establishing a lookup table depicting the relationship between the real world and the image space. As shown in FIG. 5A, the pixels (x1, y1), (x2, y2) and (x3, y3) in the image space of the image 9c are mapped to the locations (X1, Y1), (X2, Y2), and (X3, Y3) in respective, by that a formula for transforming coordinates in the image space of FIG. 5A into distances in real world of FIG. 5B can be calculated and thus obtained.

Figure 6A:
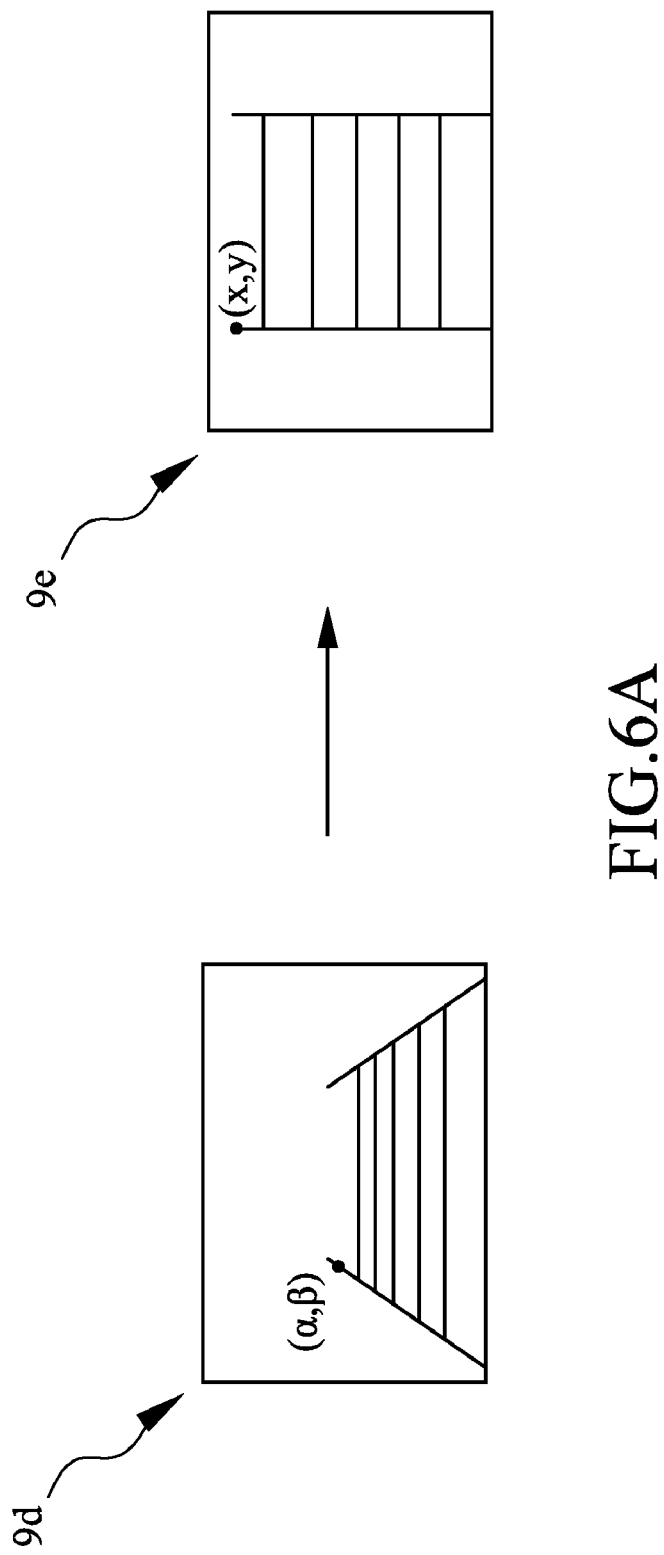
FIG. 6A to FIG. 6C are schematic diagrams relating to how an image captured by the image sensing device of the disclosure is converted into an overlook image.

At step 270, the first distance is defined to be L-times the length of the carrier; and if the distance between the carrier and the detected feature object is smaller than L-times the length of the carrier, the flow will proceeds to step 271 for performing a viewpoint transformation process. The viewpoint transformation process is performed for converting images of common viewing angle into bird-view images for facilitating the driver of the carrier to recognize the distance between the detected feature object and the carrier from the image that is displayed. As shown in FIG. 6A, the image conversion is performed by a means of image geometrical transformation that is capable of converting an image 9d captured by level viewing angle into an bird-view image 9e by the cooperation of an inverse perspective mapping algorithm and an image distortion calibration technique.

Figure 6B:
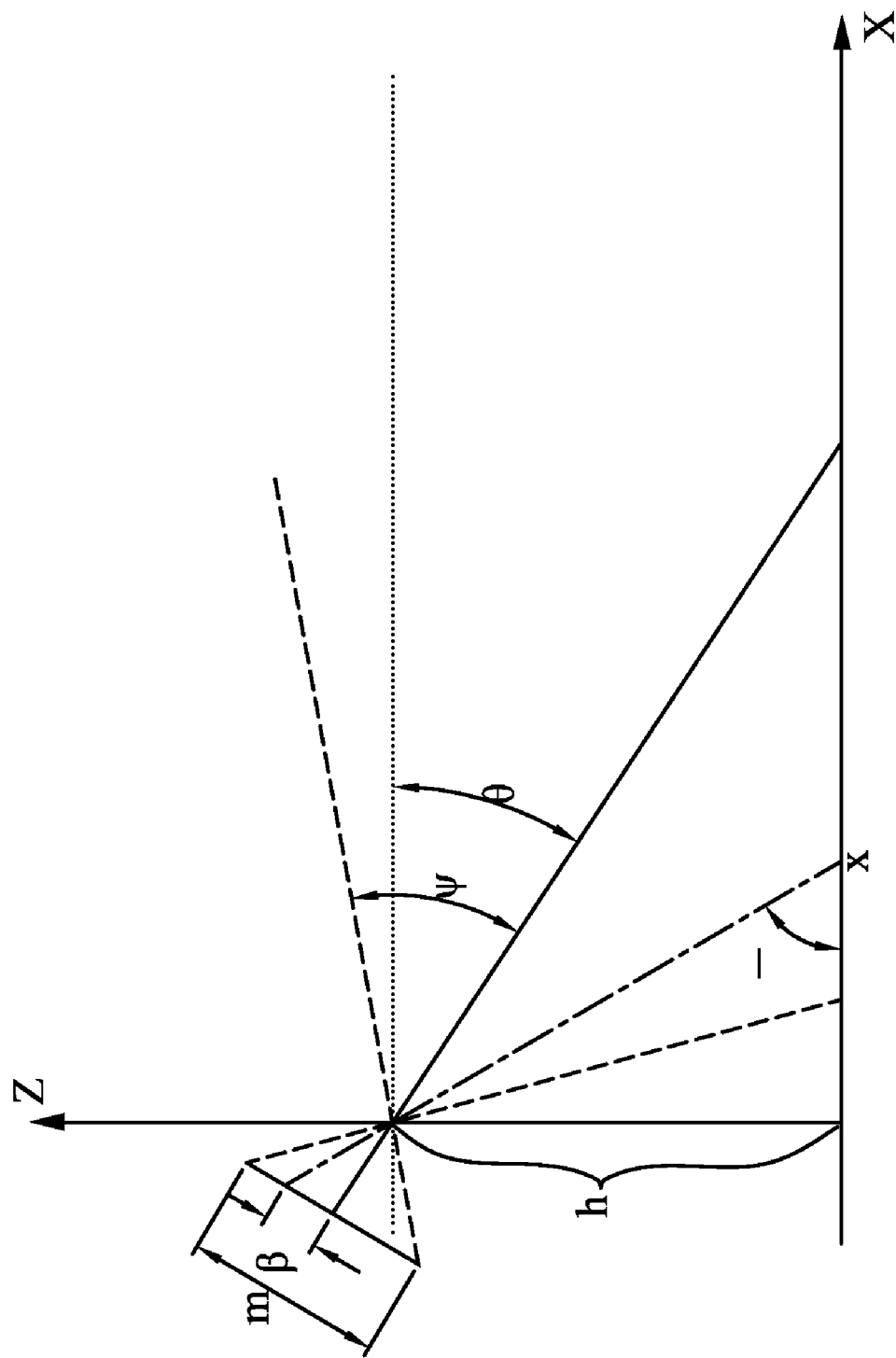
Figure 6C:
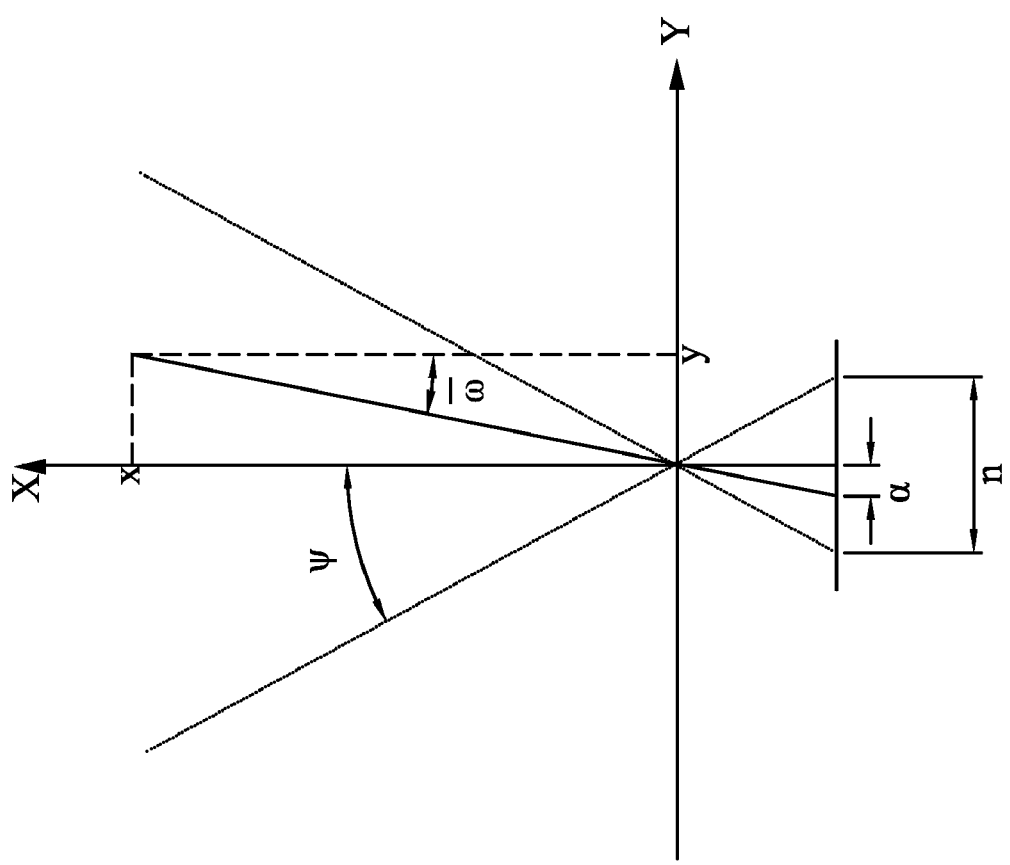

The aforesaid image conversion is based on an assumption that the carrier is moving on a flat road, so that the distance error resulting from the inverse perspective mapping can be ignored. Please refer to FIG. 6B and FIG. 6C, which are schematic diagrams relating to how an image captured by the image sensing device of the invention is converted into an overlook image. The image conversion is performed under the assumption that the carrier is moving on a plane defined by the equation Z=0 in a real world coordinate system while enabling an included angle of θ to be formed between the optical axis of a camera positioned at (0, 0, h) and the aforesaid plane and another included angle of γ to be formed between the same the X axis of the real world coordinate system. In this embodiment, the angle γ is set to be zero degree, but is not limited thereby. Assuming the camera is configured with a viewing angle of 2φ and n×m resolution, a point whose coordinate in real world is (x, y, 0) can be converted into a point (α, β) in the image space by the following formula:

$$\alpha(x, y, 0) = \frac{\varpi(x, y, 0) - (\gamma - \phi)}{\frac{2\phi}{n-1}} \quad (3)$$

$$\beta(x, y, 0) = \frac{\varpi(x, y, 0) - (\theta - \phi)}{\frac{2\phi}{m-1}}$$

wherein $1 < \alpha < n, 1 < \beta < m$; \quad (4)

$$\varpi = \arctan\left(\frac{x}{y}\right)$$

$$\varpi = \arctan\left(\frac{h}{\sqrt{x^2 + y^2}}\right)$$

Thereby, an overlook image corresponding to the original image captured by the camera at viewing angle of 2φ can be obtained. That is, the pixel (α, β, 0) in the image 9d of FIG. 6A is transformed into the pixel (x, y, 0) in the image 9e.

However, if the distance between the carrier and the detected feature object is not smaller than the first distance, the flow will proceeds to step 272 for determining whether the distance is smaller than a second distance. In this embodiment, the second distance is defined as K-times the length of the carrier, but is not limited thereby. In the step 272, when the distance between the carrier and the detected feature object is smaller than K-times the length of the carrier, the flow will proceeds to step 273 for issuing an alert signal. It is noted that the alert signal can be an alarming sound, a flashing of indication light, or an alerting icon displayed on the display unit, whichever can warn the driver of the carrier with the dangerous condition. In this embodiment, the alert signal is transmitted to the display unit for enabling the same to display an alerting icon thereon, as shown in FIG. 2C.

Figure 7A:
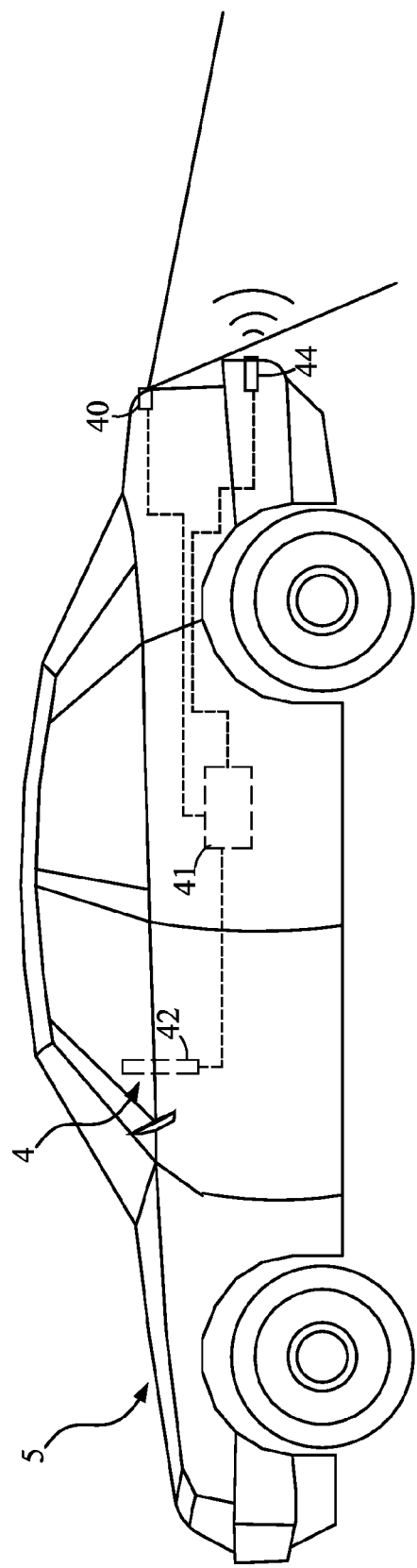
FIG. 7A is a schematic diagram showing how a driving assistance system is being mounted on a carrier in the present disclosure.
Figure 7B:
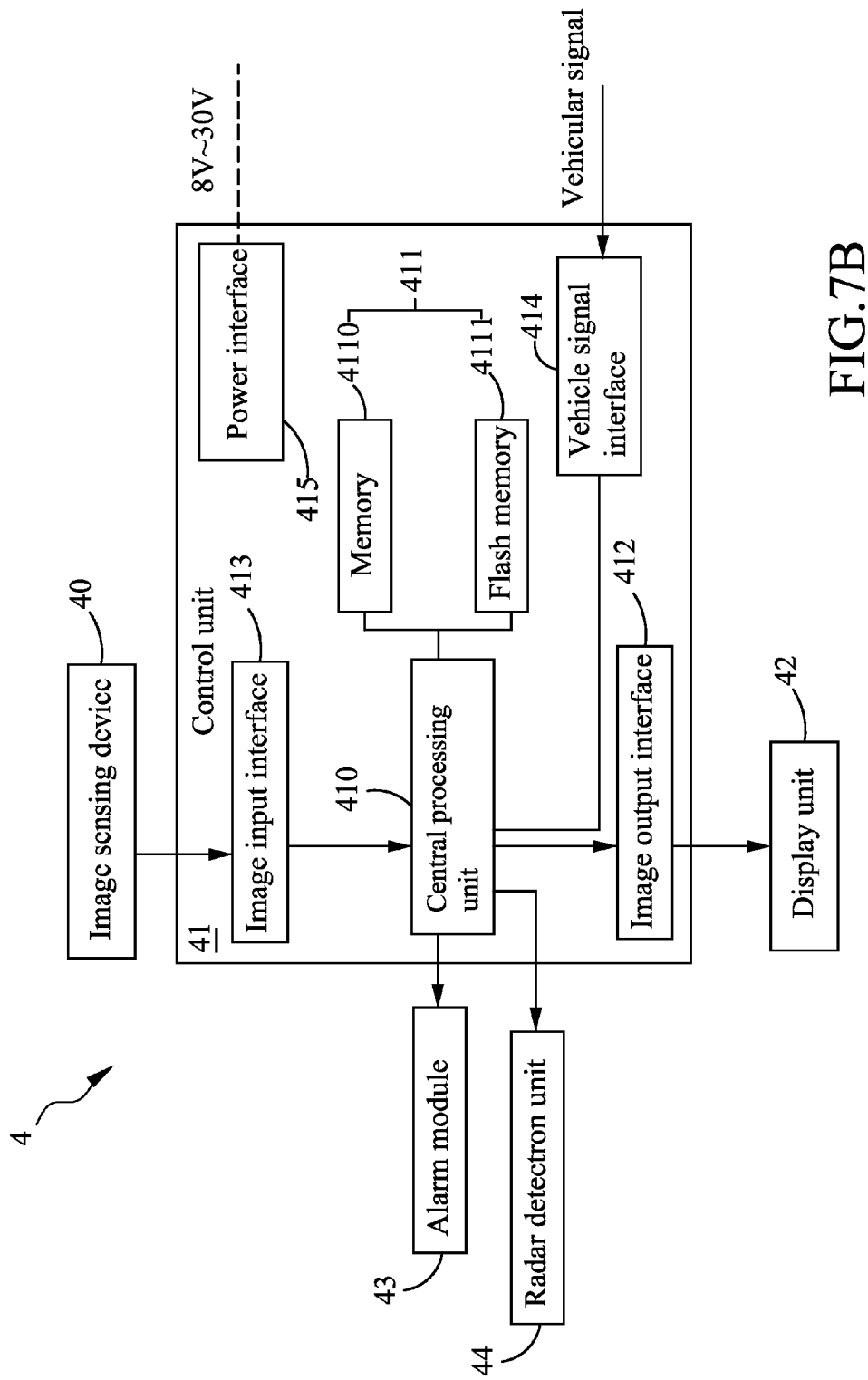
FIG. 7B is a block diagram of a driving assistance system according to an exemplary embodiment of the present disclosure.

FIG. 7A is a schematic diagram showing how a driving assistance system is being mounted on a carrier in the present disclosure; and FIG. 7B is a block diagram of a driving assistance system according to an exemplary embodiment of the present disclosure. In this embodiment, the driving assistance system 4 is mounted on a moving carrier whereas the moving carrier can be a wheeled vehicle. As shown in FIG. 7A, the driving assistance system 4 comprises: an image sensing device 40, a control unit 41, a display unit 42, an alarm module 43 and a radar detection unit 44. The image sensing device 40 is mounted on a carrier for capturing images relating to the surrounding environment of the carrier, which can be a CCD or CMOS, but is not limited thereby. It is noted that the image sensing device 40 can be disposed at any position on the carrier depending only on actual imaging requirement without any other restriction. In this embodiment, the image sensing device 40 is arranged at the rear of the carrier for capturing rear image of the carrier, that it is configured with a level viewing range between 60 degrees to 190 degrees, 15-30 frames/sec imaging frequency, and 15~20 frames/sec output speed. It is noted that the viewing angle as well as the specification of the image sensing device 40 is variable according to the type and the position of the carrier that it is mounted.

The control unit 41, being arranged coupled to the image sensing device 40 through an image input interface 413, is used for performing the following operations: performing a detection/identification process relating to a first feature object so as to determine a distance between the moving carrier and the first feature object while the carrier is moving forward; determining a moving status of the carrier according to a motion vector relating to the movement of a specific block in the various surrounding images captured by the image sensing device at different time points; constructing an assistant trajectory according to the moving status; and performing a detection/identification process relating to a second feature object while the carrier is moving backward so as to determine a distance between the moving carrier and the detected second feature object.

Moreover, the control unit 41 is further comprised of: a central processing unit 410, a memory module 411, an image output interface 412, a vehicle signal interface 414 and a power interface 415. The central processing unit 410 is capable of using an image signal received from the image input interface 412 to perform operations including image processing, image identification, distance estimation, obstacle detection, image output/input, vehicle signal input, alert signal issuance, and so on, as those exemplified in FIG. 1 and FIG. 2A~FIG. 2C. Wherein, the operation regarding to the issuing of the alert signal will activate an alarm module 43 to issue an alarm for reminding the driver of the carrier that there is an obstacle in the moving path of the carrier and thus preventing the carrier from colliding with the obstacle. It is noted that the alert signal can be an alarming sound emitted from speakers for receiving the alerting signal, a flashing of indication lights, or an icon displayed on the display unit 42, or even the combination thereof, that can be whichever capable of warning the driver of the carrier with the dangerous condition. The image output interface 412 is coupled to the display unit 42 for enabling the same to display the processing results of the central processing unit 410. For instance, the display unit 42 is able to display the moving trajectory of the carrier, the images captured by the image sensing device 40, the images after viewing angle conversion, etc. The memory module 411 is composed of a memory 4110 and a flash memory 4111. In this embodiment, the memory is a SDRAM of 32 MB, and the flash memory 4111 is a 16 MB flash memory to be used as a temporary memory space buffering the operation of the system. It is noted that the capacity of the memory module 411 is not limited by the aforesaid embodiment.

The vehicle signal interface 414 is configured for receiving a vehicular signal for activating the system 4 which can be issued from the carrier. Accordingly, the system 4 can be started according to the gear position of the carrier or by the pressing of a start button, but is not limited thereby. For instance, the system is started as soon as the carrier is in reverse gear or other specific gear. Moreover, the controller 41 is connected to a power source through the power interface 415. The display unit 42, being coupled to the control unit 41, is used for displaying the surrounding images captured by the image sensing device 40 and the assistant trajectory of the carrier that is generated by the control unit 41. The radar detection unit 44 is used for generating a radar detection signal to be used by the control unit 41 in obstacle detection. That is, if there is an obstacle existed in the ambient environment of the carrier, there will be a reflected radar signal relating to the obstacle being received by the radar detection unit 42 which will be provided to and processed by the central processing unit 410 of the control unit 41 so as to determine the distance between the obstacle and the carrier.

Comparing with those conventional driving guidance systems which require more than one kinds of sensors to provide guidance, the system of the invention is capable of guiding the maneuvering of a carrier by the use of a single sensor so that its installation can be as easy as those common car surveillance system since there is no additional automobile sensors required to be connected, and consequently the system of the invention is low in cost, easy to install and flexible in usage. Moreover, as image-based vehicle maneuvering assistant system and method of the invention is capable of generating an overlook image from an image captured from common viewing angle by the use of a conversion and distortion calibration algorithm, the present disclosure not only can provide a complete parking trajectory for directing the carrier to park into a parking space detected in the captured images, but also it can identify obstacles and traffic signs in the moving track of the carrier and the same time measure the distance therebetween so as to be used for determining whether or not a collision alert should be issued. Since the system of the invention can be configured easily by software for adapting the same to all kinds of cameras as well as any types of carriers from different manufactures, it is commercially competitive in the after-sales services market of automobile electronics.

In addition, as the method of the invention can be easily programmed for adapting the same to different cameras with regard to their internal parameters and how they are installed, the method of the present invention can be installed and operated through the cameras that are already fitted to the carrier. The method and system of the invention is applicable to various carriers, especially for large-sized transportation equipments, such as a truck, a container, or an aircraft or even a boat, whose driving safety is always in question since not only the large-sized transportation equipments usually possess many blind spot areas that are not visible to the driver, but also their backing trajectory are not easy to controlled. Thus, by installing more than one set of the image-based vehicle maneuvering assistant system of the invention on such large-sized transportation equipments, not only the driving safety of the large-sized transportation equipments using the present system/method can be enhanced, but also the safety of other carriers and pedestrians sharing the same road are ensured.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A driving assistance method, comprising the steps of:
   obtaining a surrounding image relating to the surrounding environment of a carrier while the carrier is moving;
   performing an image-based motion vector estimation based upon the variation of the surrounding image so as to determine a moving status of the carrier while the carrier is moving backward;
   constructing an assistant trajectory according to the moving status;
   making an evaluation to determine whether there is a feature object found in the varying surrounding image during the backward movement of the carrier; and if so, determining the distance between the carrier and the feature object;
   performing a first assistance process according to the distance between the moving carrier and the feature object; and
   performing a viewpoint switching operation while the distance is smaller than a first distance, wherein the viewpoint switching operation is performed for converting a coordinate (x,y,0) is real world into another coordinate ($\alpha,\beta$) in the image space by the following formula:

$$\alpha(x, y, 0) = \frac{\varpi(x, y, 0) - (\gamma - \phi)}{\frac{2\phi}{n-1}};$$

$$\beta(x, y, 0) = \frac{\varpi(x, y, 0) - (\theta - \phi)}{\frac{2\phi}{m-1}};$$

wherein, $\varpi = \arctan\left(\frac{x}{y}\right)$ and $\varpi = \arctan\left(\frac{h}{\sqrt{x^2+y^2}}\right)$.

2. The driving assistance method of claim 1, wherein the image-based motion vector estimation further comprises the steps of:
   obtaining a first image relating to the surrounding environment of a carrier at a first time point;
   selecting a datum area from the first image;
   obtaining a second image relating to the surrounding environment of the carrier at a second time point;
   performing a search in the second image for locating a comparison area that corresponds to the datum area in the first image so as to acquire an image space distance between the comparison area and the datum area; and
   determining an assistant trajectory according to the image space distance.

3. The driving assistance method of claim 2, wherein the search in the second image for locating a comparison area that corresponds to the datum area further comprises the steps of:
   calculating a first characteristic value relating to the datum area; and
   comparing every area in the second image with the datum area with regard to the first characteristic value so as to search and select an area whose sum of absolute differences is the smallest to be the comparison area.

4. The driving assistance method of claim 3, wherein the first characteristic value is a value of gray level.

5. The driving assistance method of claim 3, wherein the searching of the area whose sum of absolute difference (SAD) is the smallest to be used as the comparison area further comprises the steps of:
   designating an area in the second image to be a detection area;
   calculating the sum of absolute differences (SAD) between a second characteristic value of the detection area with the first characteristic value;
   designating another area in the second image to be a detection area;
   repeating the step (b) to step (c) so as to obtain a plurality of SADs accordingly; and
   selecting the minimum from the plural SADs.

6. The driving assistance method of claim 5, wherein the calculating of the SAD is proceeded by the following formula:

$$SAD(p,q) = \Sigma_{X,Y \in A_i} |I(t-11, X, Y) - I(t, X+p, Y+q)|;$$

while the minimum of the plural SADs is selected according to the following formula:

$$\min_{p,q} SAD_i(p,q).$$

7. The driving assistance method of claim 2, wherein the determining of the assistant trajectory of the carrier further comprises the steps of:
   determining a moving direction of the carrier according to the image space distance; and
   using the moving direction to search in a pre-established trajectory database for locating a moving trajectory as the assistant trajectory of the carrier.

8. The driving assistance method of claim 1, further comprising the steps of:
   Performing a second assistance process according to the moving speed of the carrier while the carrier is moving forward.

9. The driving assistance method of claim 8, wherein the second assistance process further comprises the steps of:
   performing a lane detection operation and an obstacle detection operation according to the surrounding image; and
   making an evaluation to determine whether or not it is required to generate an alert signal according to the results from the lane detection operation and the obstacle detection operation.

10. The driving assistance method of claim 1, wherein the first assistance process further comprises the step of:
    issuing the alert signal while the distance is smaller than a second distance.

11. The driving assistance method of claim 1, wherein the viewpoint switching operation is performed for converting the images captured from common viewing angle into bird-view images.

12. The driving assistance method of claim 1, wherein the determining of the distance between the carrier and the feature object further comprises the steps of:
    building in advance a formula for transforming coordinates used for defining locations of features detected in the images into distances in real world; and
    using the coordinates of the identified feature to obtain the distance to the identified feature.

13. A driving assistance system, comprising:
    an image sensing device, mounted on a moving carrier for capturing a surrounding image relating to the surrounding environment of the carrier;
    a control unit, coupled to the image sensing device for performing the following operations while the carrier is moving backward:
       determining a moving status of the carrier according to a motion vector relating to the movement of a specific block in the various surrounding images captured by the image sensing device at different time points;
       constructing an assistant trajectory according to the moving status;
       performing a detection/identification process relating to a first feature object so as to determine a distance between the moving carrier and the first feature object; and
       performing a viewpoint switching operation while the distance is smaller than a first distance, wherein the viewpoint switching operation is performed for converting a coordinate (x,y,0) is real world into another coordinate (α,β) in the image space by the following formula:

$$\alpha(x, y, 0) = \frac{\varpi(x, y, 0) - (\gamma - \phi)}{\frac{2\phi}{n-1}};$$

$$\beta(x, y, 0) = \frac{\varpi(x, y, 0) - (\theta - \phi)}{\frac{2\phi}{m-1}};$$

wherein, $\varpi = \arctan\left(\frac{x}{y}\right)$ and $\varpi = \arctan\left(\frac{h}{\sqrt{x^2 + y^2}}\right)$.

14. The driving assistance system of claim 13, wherein the first feature object is an object selected from the group consisting of: an obstacle and a pavement marker.

15. The driving assistance system of claim 13, wherein the control unit is designed to convert the images captured by the image sensing device into bird-view images as soon as the distance between the carrier and the first feature object detected in the images is smaller than a first distance and thus provide an bird-view image signal to the display unit.

16. The driving assistance system of claim 13, wherein the control unit is enabled to direct an alarm module to issue an alert signal as soon as the distance between the carrier and the first feature object detected in the images is smaller than a second distance.

17. The driving assistance system of claim 13, further comprises:
    a radar detection unit, for generating a radar detection signal to be used by the control unit in obstacle detection.

18. The driving assistance system of claim 13, wherein the control unit is enabled to perform a detection/identification process relating to a second feature object while the carrier is moving forward.

19. The driving assistance system of claim 18, wherein the second feature object is an object selected from the group consisting of: an obstacle and a pavement marker.

20. The driving assistance system of claim 18, wherein the control unit is enabled to make an evaluation to determine the relationship between the moving carrier and the second feature object so as to determine whether to direct an alarm module to issue an alert signal accordingly.

* * * * *